US012073087B2

(12) United States Patent
Takizawa

(10) Patent No.: US 12,073,087 B2
(45) Date of Patent: Aug. 27, 2024

(54) MEMORY CONTROLLER

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventor: Tetsuro Takizawa, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 20 days.

(21) Appl. No.: 18/173,880

(22) Filed: Feb. 24, 2023

(65) Prior Publication Data
US 2023/0289064 A1 Sep. 14, 2023

(30) Foreign Application Priority Data

Mar. 14, 2022 (JP) ................. 2022-038874

(51) Int. Cl.
G06F 3/06 (2006.01)
(52) U.S. Cl.
CPC .......... *G06F 3/0613* (2013.01); *G06F 3/0659* (2013.01); *G06F 3/0673* (2013.01)
(58) Field of Classification Search
CPC ..... G06F 3/0613; G06F 3/0659; G06F 3/0673
See application file for complete search history.

(56) References Cited

U.S. PATENT DOCUMENTS

| 2008/0216078 | A1* | 9/2008 | Miura ................... G06F 3/0685 711/E12.001 |
| 2015/0058549 | A1* | 2/2015 | Jeffrey .............. G11C 11/40622 711/106 |
| 2017/0351460 | A1* | 12/2017 | Oh ....................... G06F 13/1673 |
| 2019/0196987 | A1 | 6/2019 | Shen et al. |
| 2020/0066330 | A1 | 2/2020 | Hu et al. |
| 2020/0066331 | A1 | 2/2020 | Hu et al. |
| 2021/0335417 | A1 | 10/2021 | Hu et al. |

OTHER PUBLICATIONS

Ghosh, Mrinmoy, and Hsien-Hsin S. Lee. "Smart refresh: An enhanced memory controller design for reducing energy in conventional and 3D die-stacked DRAMs." 40th Annual IEEE/ACM international symposium on microarchitecture (MICRO 2007). IEEE, 2007. (Year: 2007).*

* cited by examiner

Primary Examiner — Nicholas J Simonetti
(74) Attorney, Agent, or Firm — Posz Law Group, PLC

(57) ABSTRACT

A memory controller issues a command to a semiconductor memory device in response to an access request from an arithmetic unit to the semiconductor memory device having multiple ranks. The memory controller includes an access request holder, an access request selector, a command generator, a refresh interval counter and a refresh counter. The access request selector calculates a total processing period for each of the ranks, selects multiple access requests as an access request group sent to an access target rank, and determines a processing order of the access requests in the selected access request group. The command generator issues an access command to the access target rank in order, and issues a refresh command to a refresh target rank.

11 Claims, 9 Drawing Sheets

MEMORY CONTROLLER

CROSS REFERENCE TO RELATED APPLICATION

This application is based on Japanese Patent Application No. 2022-038874 filed on Mar. 14, 2022, the disclosure of which is incorporated herein by reference.

TECHNICAL FIELD

The present disclosure relates to a memory controller.

BACKGROUND

A memory system may include a dynamic random access memory (DRAM) as a semiconductor memory device having multiple ranks. Such a semiconductor memory device may be required to be periodically refreshed to hold data.

SUMMARY

The present disclosure describes a memory controller that issues a command to a semiconductor memory device including multiple ranks in response to an access request sent from an arithmetic unit to the semiconductor memory device.

DETAILED DESCRIPTION

Figure 1:
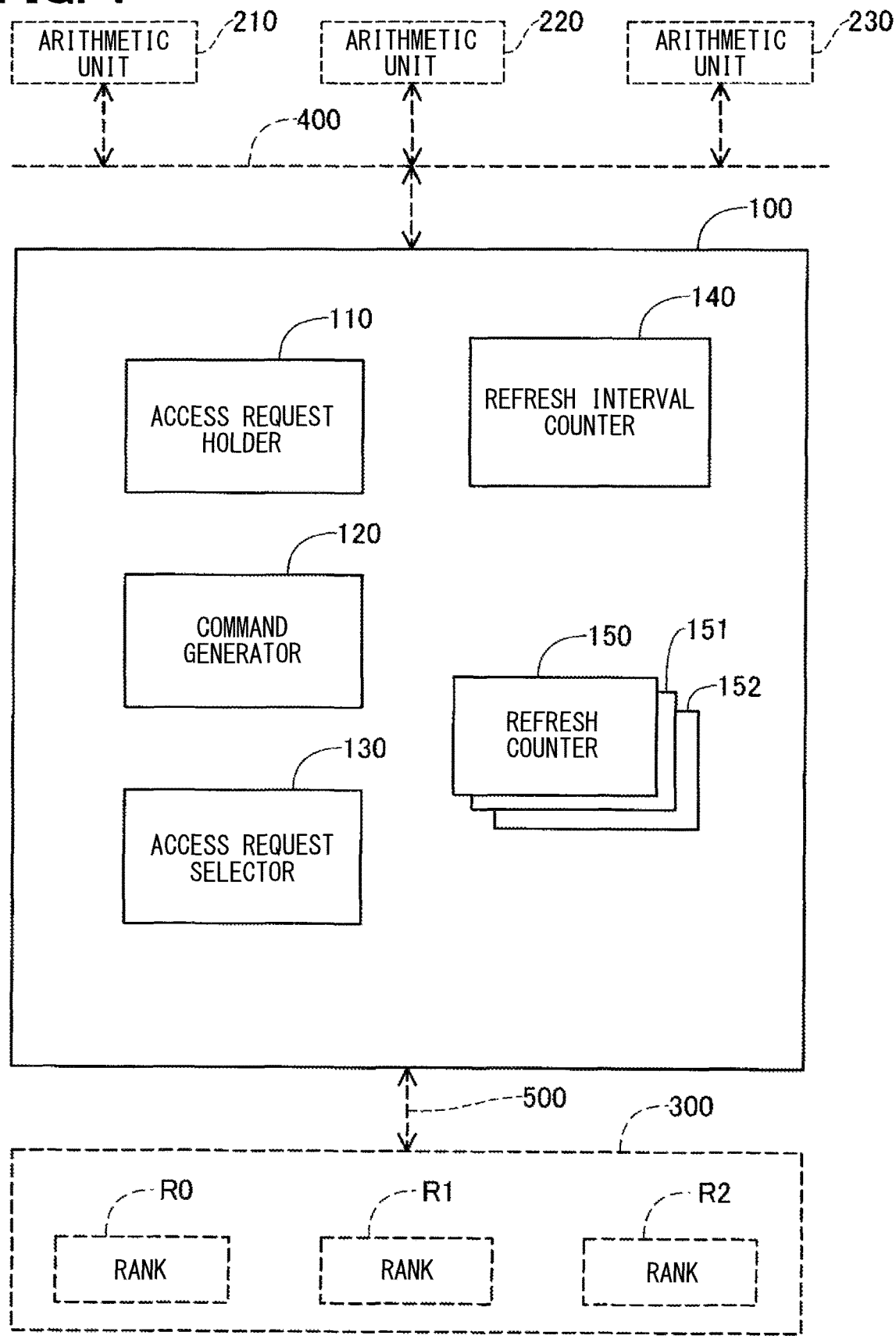
FIG. 1 is an explanatory view that illustrates a structure of a memory controller according to a first embodiment.

A memory controller may refresh the semiconductor memory at regular intervals, and memory refresh may be delayed depending on the amount of access requests sent to each rank. In a case where refresh of a rank in the semiconductor memory is delayed for a certain period of time, the rank may be forcibly refreshed.

However, in the memory controller described above, in a case where access requests are biased toward a specific rank, an access to the specific rank may not be executed in a case where the specific rank with concentrated access requests is forcibly refreshed. Other ranks different from the specific rank may be accessible, but are not accessed because there is no access request. Therefore, the access efficiency of a whole memory system may decrease.

According to an aspect of the present disclosure, the memory controller includes an access request holder, an access request selector, a command generator, a refresh interval counter and a refresh counter. The memory controller issues a command to a semiconductor memory device including multiple ranks, in response to an access request sent from an arithmetic unit to the semiconductor memory device. The access request selector calculates multiple presumed processing periods respectively for the multiple access requests according to the data length of each of the multiple access requests, and determines a processing order of the multiple access requests according to each of the multiple presumed processing periods, the access target address held in the access request holder, and the access type held in the access request holder. The command generator converts the access type indicated by each of the multiple access requests held in the access request holder to an access command as the command for instructing an access to the semiconductor memory device, and issue the access command to the semiconductor memory device according to the processing order. The refresh interval counter issues notification at each refresh interval of the semiconductor memory device. The refresh counter holds a counter value held in each of the multiple ranks, increments the counter value each time the notification is issued, and decrements the counter value each time refresh of a corresponding one of the multiple ranks is executed. The access request selector calculates a sum of the multiple presumed processing periods as a total processing period for each of the multiple ranks, selects the multiple access requests as an access request group to an access target rank being a rank included in the multiple ranks, and determines the processing order of the multiple access requests included in the access request group selected by the access request selector. The access target rank has the total processing period being longer than a refresh processing period as a period required for the refresh. The command generator issues the access command to the access target rank in order, and issues a refresh command as a command to execute the refresh for a refresh target rank whose counter value is larger than a first threshold value. The refresh target rank is a rank included in the multiple ranks and is different from the access target rank.

According to the structure of the memory controller described above, the memory controller, among multiple ranks, issues the access command to the rank as the target of the access request group whose processing period exceeds the refresh processing period, and refreshes other ranks while issuing the access command. Therefore, each of the ranks is refreshed frequently as compared with a case in which the ranks are refreshed periodically. Even though the access requests are concentrated at a portion of the ranks, it is possible to inhibit a situation of forcibly refreshing the portion of the ranks. In addition, it is possible to inhibit a decrease in the access efficiency.

First Embodiment

The following describes a first embodiment of the present disclosure with reference to the drawings.

(System Configuration)

As illustrated in FIG. 1, a memory controller 100 is interconnected with arithmetic units 210 to 230 through a bus 400. The arithmetic unit may also be referred to as an arithmetic device. Each of the arithmetic units 210 to 230 corresponds to, for example, a CPU or a graphics processing unit (GPU). The memory controller 100 may also be interconnected with a single arithmetic unit. The memory controller 100 may be interconnected with a semiconductor memory device 300 through a bus 500. The semiconductor memory device 300 according to the present embodiment is a DRAM having multiple ranks R0 to R2. However, the number of ranks included in the semiconductor memory device 300 may be 2 or any number equal to 4 or larger. The semiconductor memory device 300 may read out or write data related to an arbitrary storage unit designated by a command issued by the memory controller 100, and each of the ranks R0 to R2 includes multiple banks. The memory controller 100 issues the command to the semiconductor memory device 300 in response to an access request issued by the arithmetic units 210 to 230, and controls the semiconductor memory device 300 to execute the reading or writing of the data. In the present embodiment, the command issued by the memory controller 100 includes a read command for instructing the semiconductor memory device 300 to read out the data, a write command for instructing the semiconductor memory device 300 to write the data, and a refresh command for instructing the semiconductor memory device 300 to refresh memory.

The memory controller 100 includes an access request holder 110, a command generator 120, an access request selector 130, a refresh interval counter 140 and refresh counters 150 to 152. The access request holder 110 holds the access requests issued by the arithmetic units 210 to 230 and information related to the access requests (hereinafter referred to as access request information). The access request information includes an access target address, an access type, and a data length of the held access request. The access target address means a logical address of the access target data. In the present embodiment, the access type is indicated whether the access request is either a read access request indicating data read out by the semiconductor memory device 300 or a write access request indicating data written into the semiconductor memory device 300. The data length indicates the length of data requested to be read out or written by the read access request or the write access request. When an access command is issued, the access request holder 110 deletes the access request assuming that the access request corresponding to the issued access command is completed.

The command generator 120 converts the access target address of the access request held in the access request holder 110 to a physical address indicating a data storage region on the semiconductor memory device 300 storing the access target data. In the present embodiment, the command generator 120 determines a bit of the physical address designating a rank by referring to a lower bit of the logical address. The "lower bit" means a bit string including a least significant bit and a sufficient number of continuous bits to designate the rank among a bit string that indicates the logical address. As described above, by referring to the lower bit of the logical address to determine the bit of the physical address that specifies the rank, the access destinations are easily distributed, and it is possible to inhibit that the access requests are biased toward a specific rank.

The command generator 120 generates an access command including the converted physical address. The access command means a read command for instructing reading of data indicated by the read access request and a write command for instructing writing of data indicated by the write access request. The command generator 120 issues the access command to the semiconductor memory device 300 according to a command issuance order determined by the access request selector 130. When the semiconductor memory device 300 executes memory refresh, the command generator 120 issues a refresh command to the semiconductor memory device 300. The memory refresh may also be simply referred to as refresh in the present disclosure.

The access request selector 130 executes an access request selection process described hereinafter, and determines the processing order of the access requests held by the access request holder 110. The processing order of the access requests means the issuance order of the access commands.

The refresh interval counter 140 issues a notice to the refresh counters 150 to 152 every refresh interval. The refresh interval means a time acquired by dividing the maximum time allowed for refreshing all rows defined by the standard of the semiconductor memory device 300, by the number of rows included in the bank. The refresh interval may also be referred to as a refresh cycle.

The refresh counters 150 to 152 correspond to the ranks R0 to R2 included in the semiconductor memory device 300, and execute a count operation described hereinafter to hold count values Cnt0 to Cnt2. The counter values Cnt0 to Cnt2 are represented by positive or negative integers.

(Access Request Selection Process)

Figure 2:
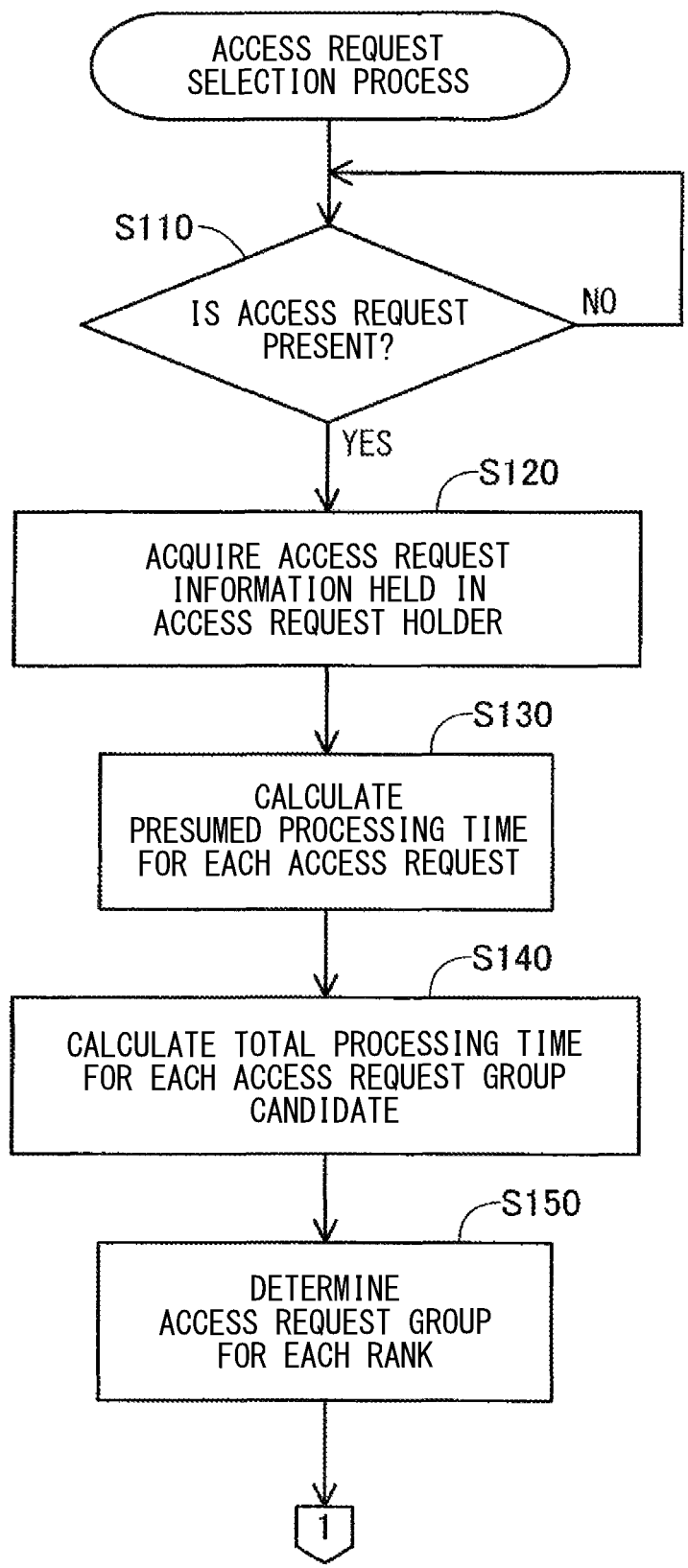
FIG. 2 is a flowchart that illustrates a processing procedure in a first half of an access request selection process according to the first embodiment.
Figure 3:
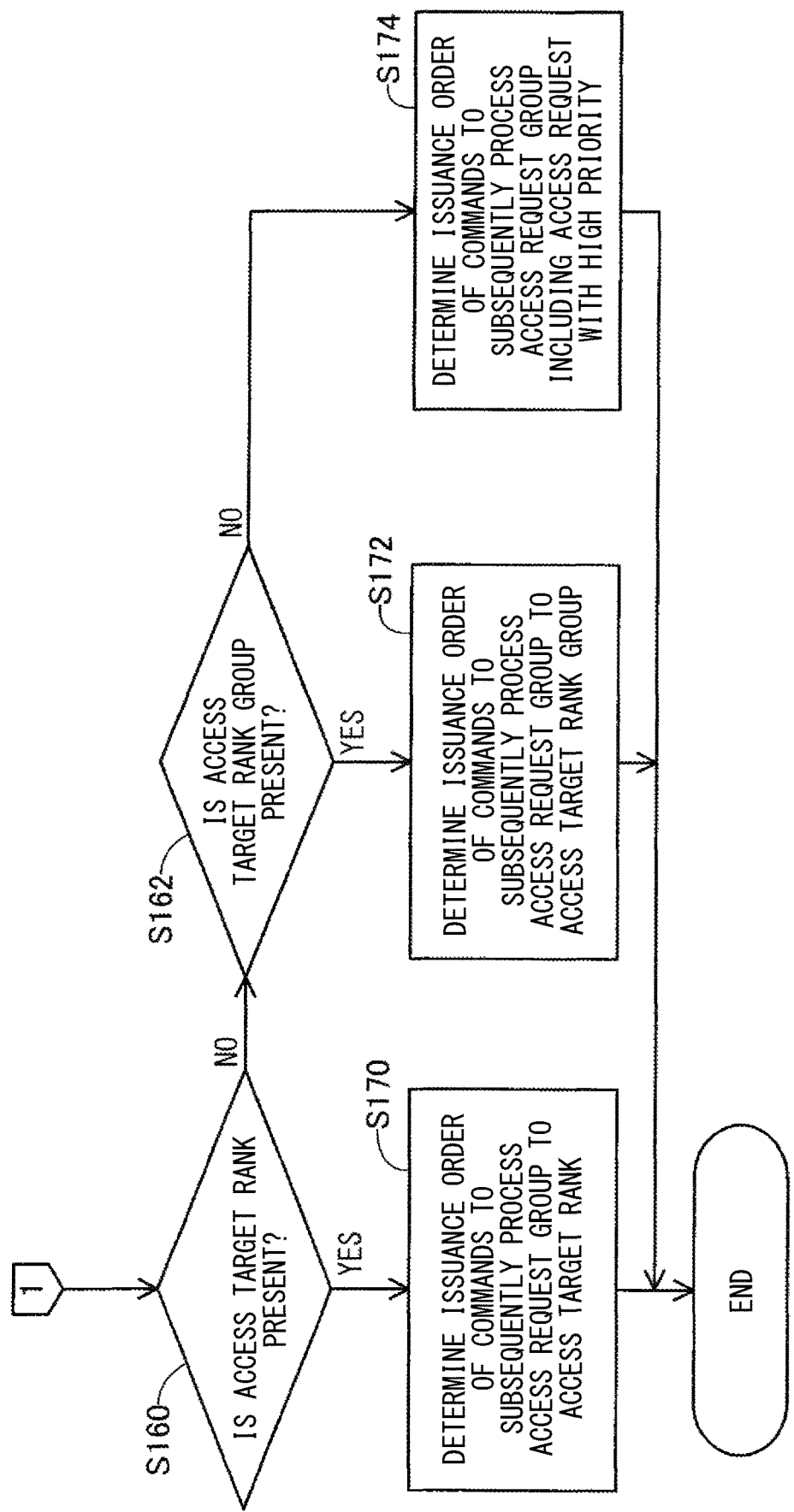
FIG. 3 is a flowchart that illustrates a processing procedure in a second half of the access request selection process according to the first embodiment.

The following describes the access request selection process as illustrated in FIGS. 2 and 3. As illustrated in FIG. 2, in S110, the access request selector 130 determines whether the access request held by the access request holder 110 is present or not. If it is determined that the access request held by the access request holder 110 is not present (S110: No), the access request selector 130 waits until the access request is held by the access request holder 110.

If it is determined that the access request held by the access request holder 110 (S110: Yes), the access request selector 130 acquires the access request information held by the access request holder 110 in S120.

The access request selector 130 calculates presumed processing time for each access request in S130. The presumed processing time means the time presumed to be required for processing the access request, which is calculated based on the data length of the acquired access request information. The presumed processing time may also be referred to as a presumed processing period.

The access request selector 130 calculates the total processing time for processing access request group candidates in S140. The access request group candidates mean multiple access requests designating the identical rank and designating the common row address in each bank. The total processing time means the sum of the presumed processing time for processing the access requests forming the access request group candidate. The total processing time may also be referred to as a total processing period.

The access request selector 130 determines the access request group for each rank in S150. The access request group means the access request group candidate having the maximum processing time among multiple access request group candidates.

As illustrated in FIG. 3, the access request selector 130 determines whether or not a rank corresponding to the access target rank among the ranks targeted by the access request group is present in S160. The access target rank means a rank in which the total processing time for processing the access request group to the rank is longer than the time required for memory refresh (hereinafter referred to a refresh processing time).

If it is determined that the access target rank is present (S160: Yes), the access request selector 130 determines the issuance order of the access commands so the access request group to the access target rank is subsequently processed in S170, and the access request selection process is completed. The access request selector 130 determines the processing order of the access requests included in the access request group to enhance the access efficiency, such as continuously processing of the identical access type of command request. In a case where multiple ranks corresponding to the access target rank are present, the access request selector 130 determines the issuance order of access commands in order to preferentially process the access request group including access requests having a high priority preliminarily set by the arithmetic units 210 to 230. The priority may be set to increase the priority as the time elapsed after the issuance of the access request becomes longer.

If it is determined that the access target rank is not present (S160: No), the access request selector 130 determines whether or not the combination of multiple ranks (for example, at least two ranks) corresponding to an access target rank group is present in S162. The access target rank group means the combination of multiple ranks in which a sum of the total processing time for processing the access request group to the multiple ranks is longer than the refresh processing time.

If it is determined that the access target rank group is present (S162: Yes), the access request selector 130 determines the issuance order of the access commands so the access request rank group to the access target rank is subsequently processed in S172, and the access request selection process is completed. In a case where multiple combinations each having multiple ranks corresponding to the access target rank group are present, the issuance order of the access commands is determined in order to preferentially process the access request group having a higher priority preliminary set, as similar to the process in a case where each of multiple ranks corresponding to the access target rank is present.

If it is determined that the access target rank group is not present (S162: No), the access request selector 130 determines the issuance order of access commands to subsequently process the access request group including the access request with a higher priority preliminarily set. After the completion of S174, the access request selector 130 completes the access request selection process.

(Count Operation)

Figure 4:
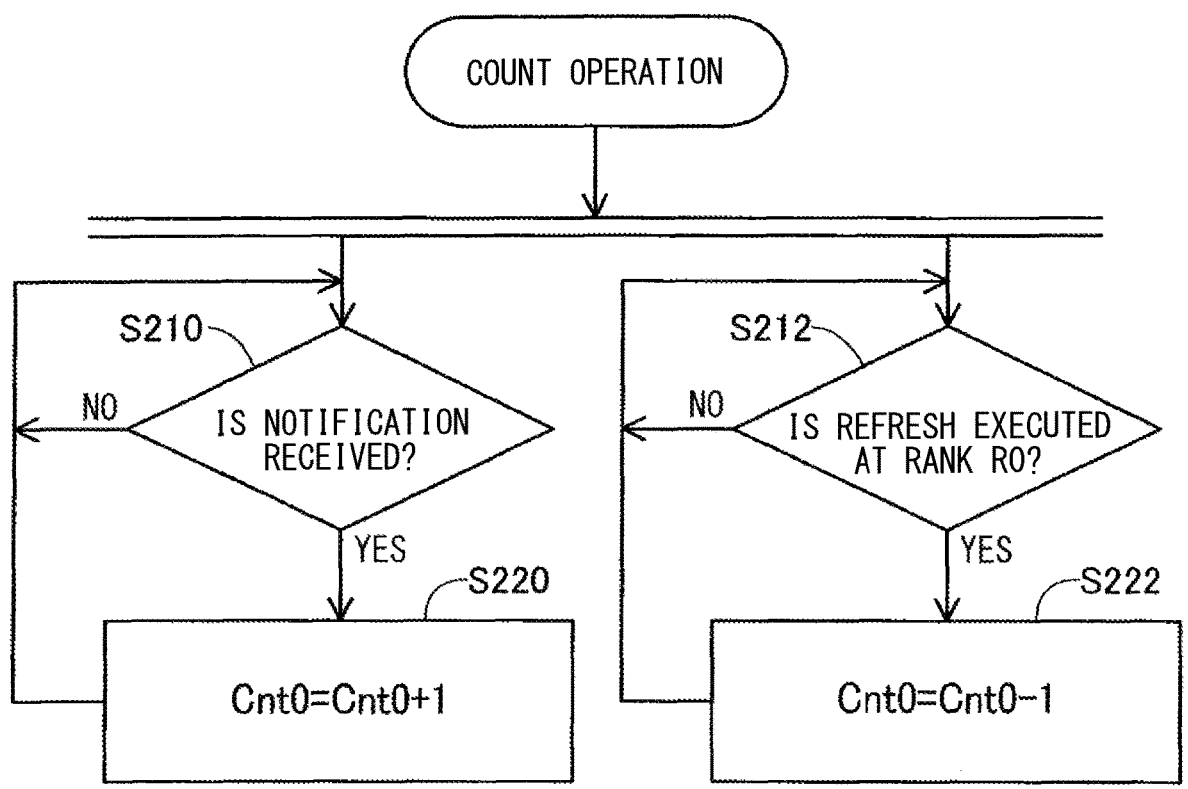
FIG. 4 is a flowchart that illustrates a processing procedure of a count operation of a refresh counter according to the first embodiment.

The following describes the count operation illustrated in FIG. 4. Since the count operation executed in each of the refresh counters 150 to 152, the following describes the count operation of the refresh counter 150 as an example. The refresh counter 150 adds 1 to the counter value Cnt0 in S220, in a case where notification issued by the refresh interval counter 140 is received (S210: Yes). The refresh counter 150 subtracts 1 from the counter value Cnt0 in S222, in a case where the memory refresh is executed in the rank R0 (S212: Yes). The refresh counter 150 performs both of an addition process and a subtraction process to run continuously during the operation of the memory controller 100. The addition process is processed each time notification is issued from the refresh interval counter 140. The subtraction process is performed each time the memory refresh is executed at the corresponding rank R0.

(Memory Access Process)

Figure 5:
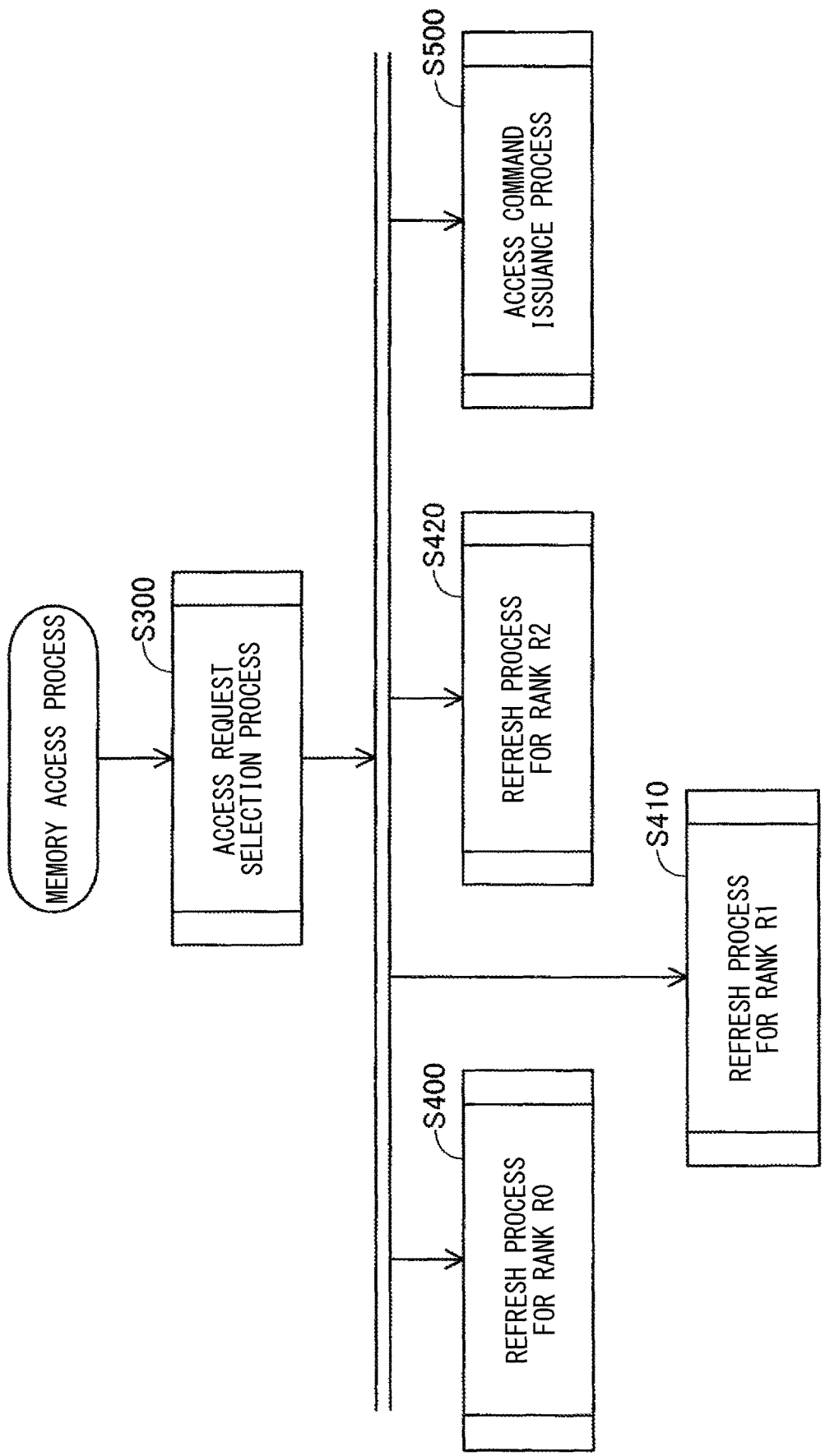
FIG. 5 is a flowchart that illustrates a processing procedure of a memory access process according to the first embodiment.

The memory controller 100 executes the memory access process according to the access requests issued from the arithmetic units 210 to 230, and issues the refresh commands and access commands. The following describes the memory access process illustrated in FIG. 5. The memory controller 100 executes the above-mentioned access request selection process in S300. The memory controller 100 executes, according to the issuance order of the access commands determined in S300, a refresh process in each of the ranks R0 to R2 in S400 to S420, and executes the access command issuance process in S500. The memory controller 100 continuously executes each refresh process and each access command issuance process during the operation of the memory controller 100. The refresh process may also be referred to as a memory refresh process.

Figure 6:
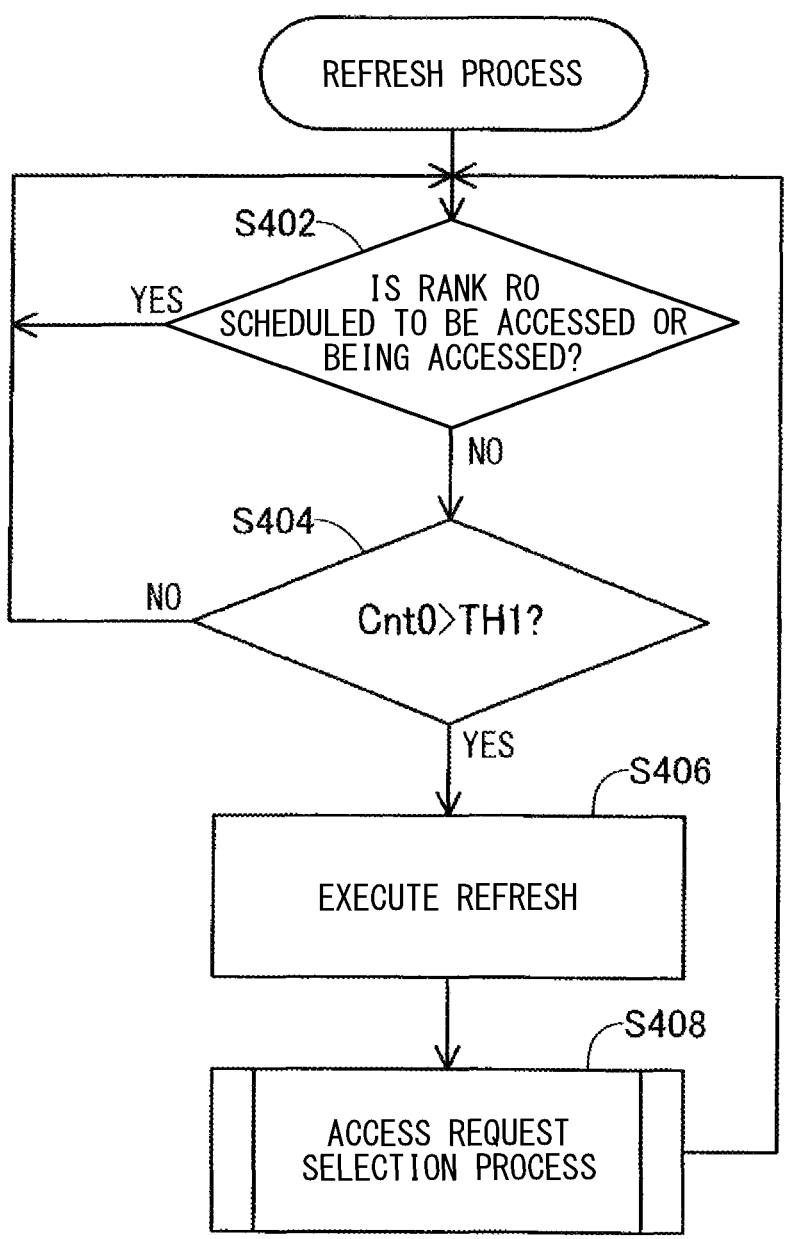
FIG. 6 is a flowchart that illustrates a processing procedure of a refresh process according to the first embodiment.

The following describes the refresh process illustrated in FIG. 6. Since the refresh process executed in each of the ranks R0 to R2, the following describes the refresh process at the rank R0 as an example. The command generator 120 determines whether or not the rank R0 is scheduled to be accessed or whether or not the rank R0 is being accessed in S402. In other words, the command generator 120 determines whether the rank R0 is the access target rank or a rank included in the access target rank group. If it is determined that the rank R0 is scheduled to be accessed or is being accessed (S402: Yes), the command generator 120 waits until the rank R0 is not scheduled to be accessed or is not to be accessed. The access means the state in which the issuance of access commands is continuously performed.

If it is determined that the rank R0 is not scheduled to be access or is not being accessed (S402: No), the command generator 120 determines whether or not the counter value Cnt0 of the refresh counter 150 is larger than or equal to a threshold value TH1 in S404. The threshold value TH1 is set to the maximum number of refresh operations for the semiconductor memory device 300 prior to the refresh interval. The maximum number of refresh operations is determined by the standard of the semiconductor memory device 300. The semiconductor memory device 300 according to the present embodiment can execute the refresh up to eight times in advance, and the threshold value TH1 is set to −8. The threshold value TH1 corresponds to a first threshold value.

If it is determined that the counter value Cnt0 is smaller than or equal to the threshold value TH1 (S404: No), the command generator 120 again executes the process in S402. If it is determined that the counter value Cnt0 is larger than the threshold value TH1 (S404: Yes), the command generator 120 issues the refresh command to refresh all of the banks belonging to the rank R0. In the present embodiment, when the process in S406 is executed, if other ranks are also in a refreshable state, the ranks are refreshed in a descending order from the counter value of the refresh counter having a larger value. The rank having the counter value being larger than the threshold value TH1 as the rank being neither the access target rank nor the rank included in the access target rank group corresponds to a refresh target rank.

After the completion of the refresh, the access request selector 130 executes the above-mentioned access request selection process in S408. In other words, the access request selector 130 executes the access request selection process each time the refresh in any rank is completed, and updates the issuance order of the access commands. After completion of S408, the process returns to S402, and the memory controller 100 repeats the processes of S402 to S408.

Figure 7:
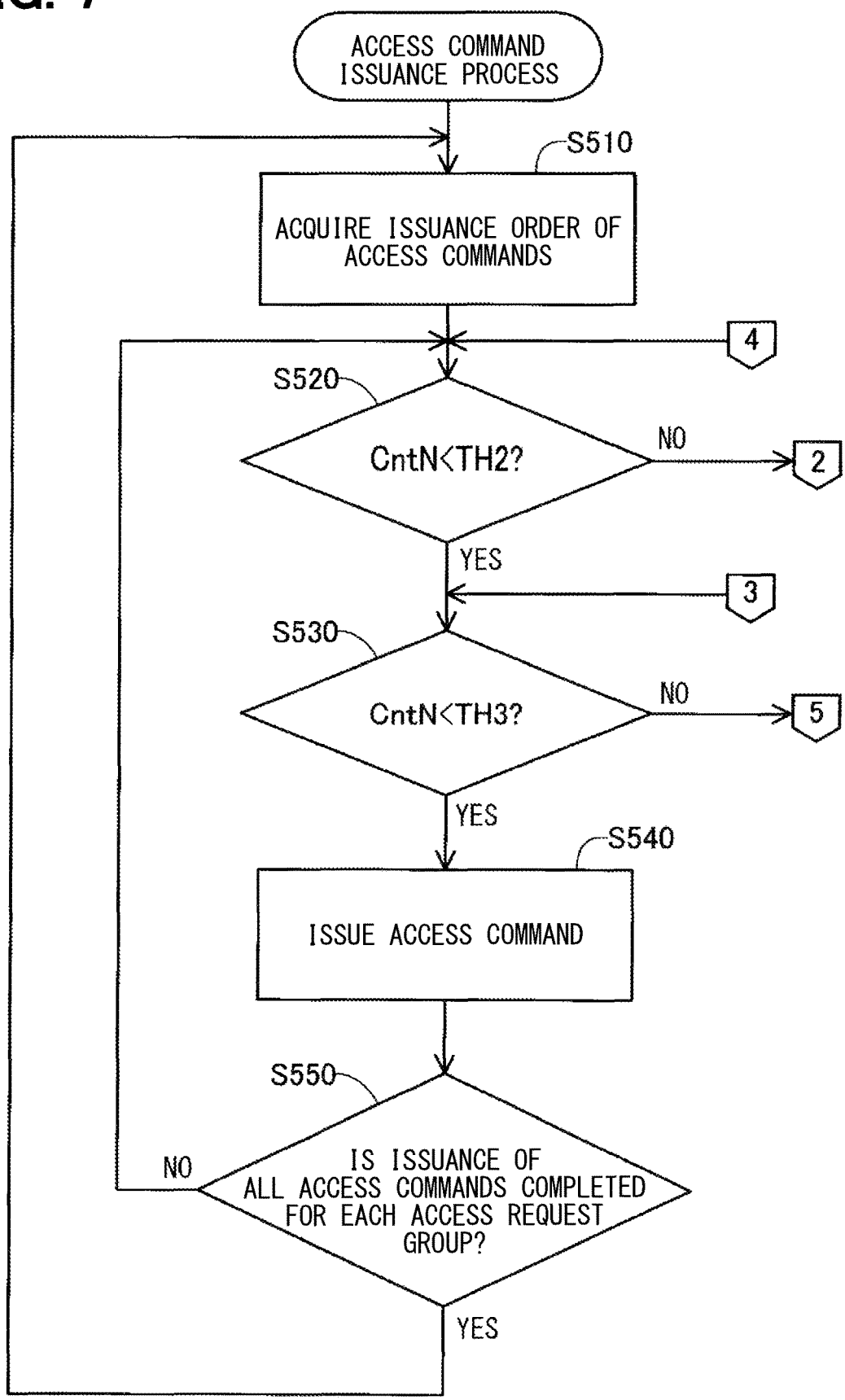
FIG. 7 is a flowchart that illustrates a processing procedure of an access command issuance process according to the first embodiment.
Figure 8:
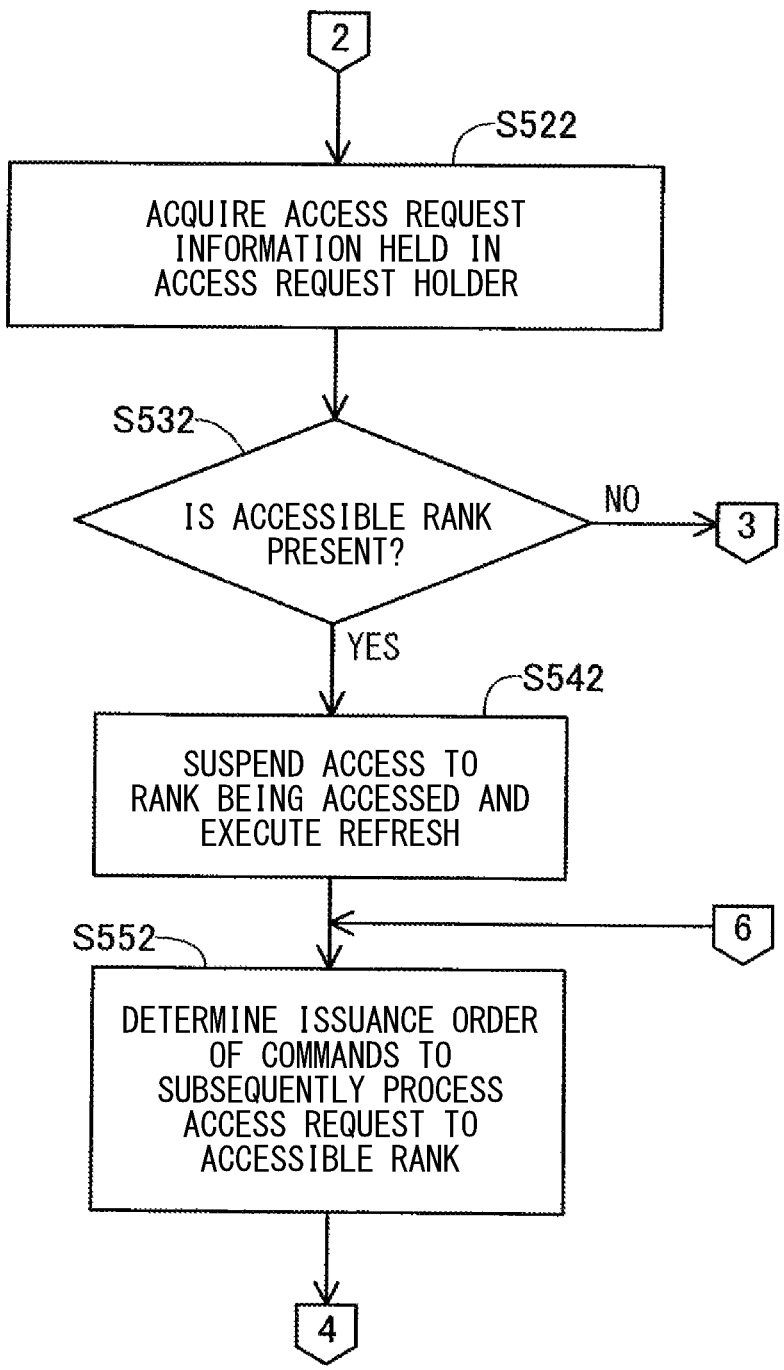
FIG. 8 is a flowchart showing a processing procedure of a process in a case where a counter value is equal to or larger than a second threshold value in the access command issuance process.
Figure 9:
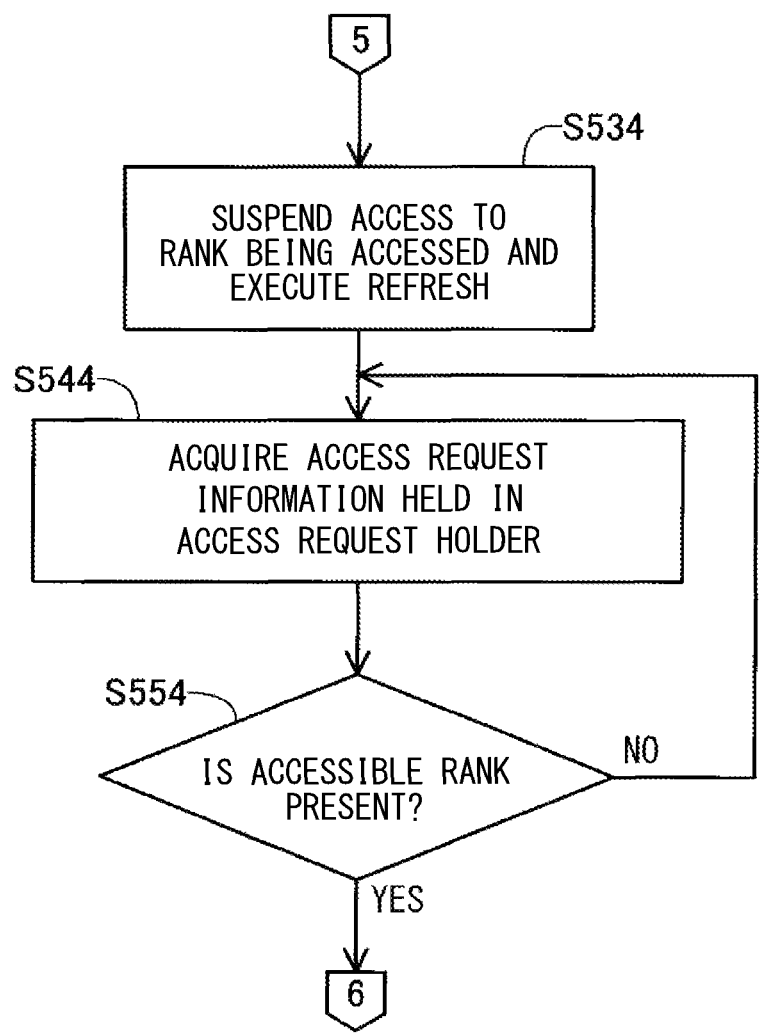
FIG. 9 is a flowchart showing a processing procedure of a process in a case where a counter value is equal to or larger than a third threshold value in the access command issuance process.

The following describes the access command issuance process illustrated in FIGS. 7 to 9. As illustrated in FIG. 7, the command generator 120 acquires the issuance order of the access commands determined by the above-mentioned access request selection process in S510.

The command generator 120 determines whether or not the counter value CntN of the refresh counter corresponding to the rank N to which the subsequent access command is to be issued is smaller than the threshold value TH2 in S520. An arbitrary value equal to or larger than 0 is set as the threshold value TH2. The threshold value TH2 corresponds to a second threshold value.

If it is determined that the counter value CntN is smaller than the threshold value TH2 (S520: Yes), the command generator 120 determines whether or not the counter value CntN is smaller than or equal to a threshold value TH3 in S530. An arbitrary value larger than the threshold value TH2 is set as the threshold value TH3. The threshold value TH3 corresponds to a third threshold value.

If it is determined that the counter value CntN is smaller than the threshold value TH3 (S530: Yes), the command generator 120 issues the access command for instructing an access according to the access type indicated by one access request according to the issuance order of the access commands in S540.

The command generator 120 determines whether all access commands have been issued for each access request group in S550. If all access commands have not been issued (S550: No), the command generator 120 repeats the processes in respective S520 to S540 until all access commands have been issued. If all access commands have been issued (S550: Yes), the memory controller 100 again executes the process in S510, and then again repeats the processes in respective S520 to S540.

If it is determined in S520 that the counter value CntN is larger than or equal to the threshold value TH2 (S520: No), as illustrated in FIG. 8, the access request selector 130 acquires the access request information held in the access request holder 110. A rank whose counter value is larger than or equal to the threshold value TH2 corresponds to a first priority refresh rank.

By adopting the acquired access request information, the command generator 120 determines whether or not the accessible rank is present in S532. The accessible rank means a rank other than the rank currently being accessed, which has already been refreshed and has a request access to the corresponding rank. If it is determined that the accessible rank is not present (S532: No), the command generator 120 executes the process in S530 as illustrated in FIG. 7.

As illustrated in FIG. 8, if it is determined that the accessible rank is present (S532: Yes), the command generator 120 suspends access to the rank which is being currently accessed, and refreshes the suspended rank in S542.

The command generator 120 determines the issuance order of the commands so that the access request to the accessible rank is processed subsequently in S552, and executes the process in S520 as illustrated in FIG. 7.

If it is determined in S530 as illustrated in FIG. 7 that the counter value CntN is larger than or equal to the threshold value TH3 (S530: No), as illustrated in FIG. 9, the command generator 120 suspends the access to the rank which is currently being accessed, and refreshes the suspended rank in S534. A rank whose counter value is larger than or equal to the threshold value TH3 corresponds to a second priority refresh rank.

The access request selector 130 acquires the access request information held in the access request holder 110 in S544. By adopting the acquired access request information, the command generator 120 determines whether or not the accessible rank is present in S554.

If the accessible rank is not present (S554: No), the command generator 120 repetitively executes S544 and S554 until the accessible rank appears. If it is determined that the accessible rank is present (S554: Yes), the command generator 120 executes the process in S552 as illustrated in FIG. 8.

According to the memory controller 100 in the present embodiment, the access command is issued to the access target rank, and executes refresh of other ranks while the access command is being issued to the access target rank. Since each rank is refreshed more frequently than a situation of being refreshed periodically, even though the access requests are unevenly concentrated to the access target rank, it is possible to inhibit the refresh being forcibly executed and to inhibit the degradation of the access efficiency in the access target rank.

Since the memory controller 100 selects multiple access requests as the access request group that designates a common row address for each bank, it is possible to inhibit the number of changes in the row address and to further inhibit a decrease in the access efficiency.

In a case where multiple refresh target ranks are present, since the memory controller 100 issues the refresh command in order from a refresh target rank whose counter value is larger, it is possible to preferentially execute refresh in order from a rank with higher necessity and to inhibit a decrease in the stability of the data retention in the semiconductor memory device 300.

In a case where multiple access target ranks are present, the memory controller 100 is processed in order from the rank having the access request whose preliminarily set priority is higher. Therefore, it is possible to efficiently process the access request.

In a case where the access target rank is not present, the memory controller 100 issues the access command to the access target rank group, and executes the refresh of other ranks while the access command is being issued to the access target rank group. Therefore, it is possible to inhibit a decrease in the access efficiency, as similar to the issuance of the access command to the access target rank.

In a case where the counter value of the access target rank is larger than or equal to the threshold value TH2 and the accessible rank is present in addition to the corresponding rank, the memory controller 100 suspends the issuance of the access command to the rank which is being accessed, and issues the access command to the accessible rank. Therefore, it is possible that the memory system as a whole executes refresh without stopping the issuance of the access command, and it is possible to inhibit a decrease in the access efficiency.

In a case where the counter value of the access target rank is larger than or equal to the threshold value TH3, since the memory controller 100 suspends the issuance of the access command to the corresponding rank to issue the refresh command, it is possible to execute the rank to be the access target, and it is possible to inhibit a decrease in the stability of the data retention of the semiconductor memory device 300.

During the conversion from the logical address to the physical address, since the memory controller 100 determines the rank address in the physical address by referring to the lower bit of the logical address, the access designations are easily distributed. Therefore, it is possible to inhibit the concentration of the access requests at the specific rank.

OTHER EMBODIMENTS

In the above embodiment, in a case where multiple refresh target ranks are present, the command generator 120 issues the refresh commands in order from the rank whose counter value is larger. However, it is not limited to the above situation. Regardless of the counter value, the command generator 120 may issue the refresh commands in any order.

In the above embodiment, the access request selector 130 selects multiple access requests as the access request group designating the common row address. However, it is not limited to the above situation. The access request selector 130 may select, as the access request group, multiple access requests designating different row addresses for each bank. When the access request is selected as described above, for example, in a case where there are a sufficient number of access requests to other banks, the access requests to other banks may be processed during the respective processes of two access requests with different designated row addresses. Therefore, the access request may be processed with an order that can inhibit a decrease in the access efficiency.

In the above embodiment, in a case where multiple access target ranks or access target rank groups are present, the issuance order of the access commands is determined such that the access request group including the access request whose priority is set to be high is preferentially processed. However, it is not limited to the above situation. Regardless of the priority, the access request selector 130 may process the access request group in any order.

In the above embodiment, during the conversion of the access target address from the logical address to the physical address, the command generator 120 determines the bit of the physical address designating the rank address by referring to the lower bits of the logical address. However, it is not limited to the above situation. The command generator 120 may determine the bit of the physical address designating the rank address by referring to upper bit of the logical address.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. In addition, as long as a technical feature is not described as essential in the present specification, the technical feature may be deleted as appropriate.

The controller such as the memory controller 100 and the techniques thereof according to the present disclosure may be implemented by one or more special-purposed computers. Such a special-purposed computer may be provided by configuring a processor and a memory programmed to execute one or more functions embodied by a computer program. Alternatively, the controller and the like and the method thereof described in the present disclosure may be achieved by a dedicated computer provided by configuring a processor with one or more dedicated hardware logic circuits. Alternatively, the controller and the like and the method thereof described in the present disclosure may be achieved by one or more dedicated computers configured by a combination of a processor and a memory programmed to execute one or more functions and a processor configured by one or more hardware logic circuits. The computer program may be stored, as instructions to be executed by a computer, in a tangible non-transitory computer-readable medium.

What is claimed is:

1. A memory controller comprising:
an access request holder;
an access request selector;
a command generator;
a refresh interval counter; and
a refresh counter, wherein
the memory controller is configured to issue a command to a semiconductor memory device including a plurality of ranks, in response to an access request sent from an arithmetic unit to the semiconductor memory device,
the access request holder is configured to:
  hold the access request including a plurality of access requests; and
  hold an access target address, an access type, and a data length of each of the plurality of access requests,
the access request selector is configured to:
  calculate a plurality of presumed processing periods for respectively processing the plurality of access requests, according to the data length of each of the plurality of access requests; and
  determine a processing order of the plurality of access requests according to each of the plurality of presumed processing periods, the access target address held in the access request holder, and the access type held in the access request holder,
the command generator is configured to:
  convert the access type indicated by each of the plurality of the access requests held in the access request holder to an access command as the command for instructing an access to the semiconductor memory device; and
  issue the access command to the semiconductor memory device according to the processing order,
the refresh interval counter is configured to issue notification at each refresh interval of the semiconductor memory device,
the refresh counter is configured to:
  hold a counter value held in each of the plurality of ranks;
  increment the counter value each time the notification is issued; and
  decrement the counter value each time refresh of a corresponding one of the plurality of ranks is executed,
the access request selector is further configured to:
  calculate a sum of the plurality of presumed processing periods as a total processing period for each of the plurality of ranks;
  select the plurality of access requests as an access request group to an access target rank being a rank included in the plurality of ranks, the access target rank having the total processing period being longer than a refresh processing period as a period required for the refresh; and
  determine the processing order of the plurality of access requests included in the access request group selected by the access request selector, and
the command generator is further configured to:
  issue the access command to the access target rank in order; and issue a refresh command as a command to execute the refresh for a refresh target rank whose counter value is larger than a first threshold value, the refresh target rank being a rank included in the plurality of ranks and being different from the access target rank.

2. The memory controller according to claim 1, wherein the semiconductor memory device further includes a plurality of banks, and
the plurality of access requests in the access request group respectively designate the plurality of banks, and mutually designate a common row address in the semiconductor memory device.

3. The memory controller according to claim 1, wherein, based on a condition that the refresh target rank includes a plurality of refresh target ranks, the command generator is further configured to issue the refresh command to each of the plurality of refresh target ranks in order from a rank whose counter value is larger than respective counter values of other ranks.

4. The memory controller according to claim 1, wherein, based on a condition that the access target rank includes a plurality of access target ranks, the command generator is further configured to issue the access command to each of the plurality of access target ranks in order from a rank including the access request having a priority set to be higher than a priority of the access request included in each of other ranks.

5. The memory controller according to claim 4, wherein the priority is preliminarily set by the arithmetic unit.

6. The memory controller according to claim 4, wherein the access request selector is further configured to set the priority while increasing the priority as a period elapsed from issuance of the access request becomes longer.

7. The memory controller according to claim 1, wherein, based on a condition that: (i) number of the plurality of ranks included in the semiconductor memory device is three or larger; and (ii) the plurality of ranks do not include a rank corresponding to the access target rank, the command generator is further configured to:
issue the access command to an access target rank group as a combination of at least two of the plurality of ranks, the total processing period including a plurality of total processing periods respectively for the at least two of the plurality of ranks in the access target rank group, the access target rank group having a sum of the plurality of total processing periods being longer than the refresh processing period; and
issue the refresh command to a rank whose counter value is larger than the first threshold value among the plurality of ranks and not being included in the access target rank group.

8. The memory controller according to claim 1, wherein, based on a condition that: (i) the access target rank is a first priority refresh rank whose counter value is larger than or equal to a second threshold value; and (ii) the access request and an accessible rank for which the refresh has been completed are present in addition to the first priority refresh rank, the command generator is further configured to:
suspend issuance of the access command to the first priority refresh rank;
issue the refresh command to the first priority refresh rank; and
issue the access command to the accessible rank.

9. The memory controller according to claim 8, wherein based on a condition that the access target rank is a second priority refresh rank whose counter value is larger than or equal to a third threshold value being larger than the second threshold value, the command generator is further configured to:
suspend issuance of the access command to the second priority refresh rank; and
issue the refresh command to the second priority refresh rank, and
based on a condition that the access request and the accessible rank for which the refresh has been completed are present in addition to the second priority refresh rank, the command generator is further configured to issue the access command to the accessible rank.

10. The memory controller according to claim 1, wherein, during conversion from a logical address to a physical address, the command generator is further configured to determine a rank address of the physical address by referring to a lower bit of the logical address.

11. A memory controller comprising:
a processor and a memory that stores instructions configured to, when executed by the processor, cause the processor to:
issue a command to a semiconductor memory device having a plurality of ranks, in response to an access request sent from an arithmetic unit to the semiconductor memory device;
hold the access request including a plurality of access requests;
hold an access target address, an access type, and a data length of each of the plurality of access requests;
calculate a plurality of presumed processing periods for respectively processing the plurality of access requests, according to the data length of each of the plurality of access requests;
determine a processing order of the plurality of access requests according to each of the plurality of presumed processing periods, the access target address held in the processor, and the access type held in the processor;
convert the access type indicated by each of the plurality of access requests held in the processor to an access command as the command for instructing an access to the semiconductor memory device;
issue the access command to the semiconductor memory device according to the processing order;
issue notification at each refresh interval of the semiconductor memory device;
hold a counter value held in each of the plurality of ranks;
increment the counter value each time the notification is issued;
decrement the counter value each time refresh of a corresponding one of the plurality of ranks is executed;
calculate a sum of the plurality of presumed processing periods as a total processing period for each of the plurality of ranks;
select the plurality of access requests as an access request group to an access target rank being a rank included in the plurality of ranks, the access target rank having the total processing period being longer than a refresh processing period as a period required for the refresh;
determine the processing order of the plurality of access requests included in the access request group selected by the processor;

issue the access command to the access target rank in order; and issue a refresh command as a command to execute the refresh for a refresh target rank whose counter value is larger than a first threshold value, the refresh target rank being a rank included in the plurality of ranks and being different from the access target rank.

\* \* \* \* \*